US009524053B2

(12) United States Patent
Kanamori

(10) Patent No.: US 9,524,053 B2
(45) Date of Patent: Dec. 20, 2016

(54) INFORMATION PROCESSING DEVICE

(71) Applicant: Sharp Kabushiki Kaisha, Osaka-shi, Osaka (JP)

(72) Inventor: Hirokazu Kanamori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 18 days.

(21) Appl. No.: 14/761,375

(22) PCT Filed: Feb. 14, 2014

(86) PCT No.: PCT/JP2014/053526
§ 371 (c)(1),
(2) Date: Jul. 16, 2015

(87) PCT Pub. No.: WO2014/148169
PCT Pub. Date: Sep. 25, 2014

(65) Prior Publication Data
US 2015/0355779 A1  Dec. 10, 2015

(30) Foreign Application Priority Data

Mar. 22, 2013  (JP) ................................ 2013-061031

(51) Int. Cl.
*G06F 3/041* (2006.01)
*G06F 3/0485* (2013.01)
*G06F 3/0488* (2013.01)

(52) U.S. Cl.
CPC ........... *G06F 3/0416* (2013.01); *G06F 3/0485* (2013.01); *G06F 3/04883* (2013.01); *G06F 2203/04108* (2013.01)

(58) Field of Classification Search
CPC ...... G06F 3/044; G06F 3/0416; G06F 3/0488; G06F 2203/04101; G06F 3/0412; G06F 2203/04108; G06F 3/0482; G06F 3/04842; G06F 3/0485; G06F 3/04817; G06F 3/04845; G06F 3/04855; G06F 3/0481; G06F 3/04847; G06F 3/0486

See application file for complete search history.

(56) References Cited

U.S. PATENT DOCUMENTS

| 2009/0244019 | A1* | 10/2009 | Choi | G06F 3/0482 345/173 |
| 2009/0244023 | A1* | 10/2009 | Kim | G06F 3/0416 345/173 |

(Continued)

FOREIGN PATENT DOCUMENTS

| JP | 2011-034502 A | 2/2011 |
| JP | 2011-150413 A | 8/2011 |

(Continued)

OTHER PUBLICATIONS

Official Communication issued in International Patent Application No. PCT/JP2014/053526, mailed on Apr. 1, 2014.

*Primary Examiner* — Hong Zhou
(74) *Attorney, Agent, or Firm* — Keating & Bennett, LLP

(57) ABSTRACT

An information processing device (1) of the present invention includes: a contact input section (51) for detecting an operating object being in a contact state; a proximity input section (52) for detecting the operating object being in a proximity state; a contact position obtaining section (20, 21) for obtaining a contact position; a proximity position obtaining section (22, 23) for obtaining a proximity position; an inputted contents specifying section (25, 27) for specifying an input from a user in accordance with the contact position and the proximity position; and a process carrying out section (26) for carrying out a process in accordance with the input.

3 Claims, 9 Drawing Sheets

(56) References Cited

U.S. PATENT DOCUMENTS

| | | | |
|---|---|---|---|
| 2009/0289914 A1* | 11/2009 | Cho | G06F 3/044 345/173 |
| 2010/0156813 A1* | 6/2010 | Duarte | G06F 3/0488 345/173 |
| 2010/0275150 A1* | 10/2010 | Chiba | G06F 3/0488 715/784 |
| 2011/0032198 A1 | 2/2011 | Miyazawa et al. | |
| 2011/0090161 A1* | 4/2011 | Tsuzaki | G06F 1/3203 345/173 |
| 2011/0175829 A1 | 7/2011 | Miyazawa et al. | |
| 2011/0175831 A1* | 7/2011 | Miyazawa | G06F 3/041 345/173 |
| 2012/0056833 A1 | 3/2012 | Narita et al. | |
| 2012/0069043 A1* | 3/2012 | Narita | G06F 3/0482 345/589 |
| 2012/0249456 A1* | 10/2012 | Taka | G01C 21/3664 345/173 |
| 2012/0256963 A1* | 10/2012 | Suzuki | G06F 3/0416 345/661 |
| 2014/0218337 A1* | 8/2014 | Yamaguchi | G06F 3/044 345/174 |

FOREIGN PATENT DOCUMENTS

| | | |
|---|---|---|
| JP | 2012-048279 A | 3/2012 |
| JP | 2012-058919 A | 3/2012 |
| JP | 2012-155506 A | 8/2012 |

* cited by examiner

| A:CONTACT START POSITION AND PROXIMITY END POSITION ARE LOCATED IN RESPECTIVE DIFFERENT REGIONS | FINALIZE MOVEMENT |
|---|---|
| B:CONTACT START POSITION AND PROXIMITY END POSITION ARE LOCATED IN IDENTICAL REGION | COPY |

(a)

| | | |
|---|---|---|
| DISTANCE BETWEEN CONTACT END POSITION AND PROXIMITY END POSITION < r | 0~120° | COPY |
| | 120~240° | CREATE SHORTCUT |
| | 240~360° | FINALIZE MOVEMENT |
| DISTANCE BETWEEN CONTACT END POSITION AND PROXIMITY END POSITION ≥ r | 0~120° | COPY AND EXECUTE |
| | 120~240° | CREATE SHORTCUT AND EXECUTE |
| | 240~360° | FINALIZE MOVEMENT AND EXECUTE |

(b)

INFORMATION PROCESSING DEVICE

TECHNICAL FIELD

The present invention relates to an information processing device and the like including a touch panel capable of detecting an operation conducted with the use of an operating object which is in a proximity state.

BACKGROUND ART

Conventionally, there has been known a touch panel capable of detecting not only an operation conducted with the use of an operating object (such as a finger and a touch pen) which is in a contact state, but also an operation conducted with the use of the operating object which is in a proximity state. The proximity state is, out of non-contact states, a state where the operating object is within a range in which the touch panel is capable of detecting a position of the operating object (detectable range). Patent Literatures 1 through 3 each disclose a technique employing the touch panel.

Patent Literature 1 discloses a technique of (i) causing a displayed map to remain enlarged in a case where a finger is promptly detached from a touch panel and (ii) reducing the displayed map in size in a case where the finger which has been in a contact state is slowly detached from the touch panel. Patent Literature 2 discloses a technique of (i) specifying from which of a contact state, a proximity state, and a distance state (state where an operating object is located outside a detectable range of a touch panel) to which of them the operating object is changed and (ii) setting an operation command depending on such a change in state. Patent Literature 3 discloses a technique of carrying out a predetermined process in a case where an operating object which is in a proximity state is moved between regions.

CITATION LIST

Patent Literatures

[Patent Literature 1]
Japanese Patent Application Publication, Tokukai No. 2012-48279 (Publication date: Mar. 8, 2012)
[Patent Literature 2]
Japanese Patent Application Publication, Tokukai No. 2011-34502 (Publication date: Feb. 17, 2011)
[Patent Literature 3]
Japanese Patent Application Publication, Tokukai No. 2012-58919 (Publication date: Mar. 22, 2012)

SUMMARY OF INVENTION

Technical Problem

The technique of Patent Literature 1 uses information on a speed at which the finger is detached from a surface of the touch panel. The technique of Patent Literature 2 merely uses a change from the contact state to the proximity state. Therefore, the techniques of Patent Literatures 1 and 2 do not use information on a position of the finger which has been detached from the surface of the touch panel and is currently in the proximity state.

The technique of Patent Literature 3 uses information on a position of the operating object which is in the proximity state. However, the technique does distinguish between the information on the position of the operating object which is in the proximity state and information on a position of the operating object which is in the contact state. Therefore, the technique has such a problem that only a few types of operations can be conducted, so that the technique lacks flexibility in terms of operations and accordingly results in poor operability.

The present invention has been made in view of the above problems, and an object of the present invention is to provide an information processing device and the like capable of operating with the use of (i) information on a position of an operating object which is in a proximity state and (ii) information on a position of the operating object which is in a contact state.

Solution to Problem

In order to attain the above object, an information processing device in accordance with an aspect of the present invention includes: a contact input section for detecting an operating object (finger), which is used by a user to conduct an operation, being in a contact state where the operating object is in contact with a surface of a touch panel; a proximity input section for detecting the operating object being in a proximity state where the operating object is not in contact with the surface of the touch panel and is located within a given distance from the surface of the touch panel; a contact position obtaining section for obtaining, as a contact position, a position on the touch panel at which position the operating object being in the contact state is detected by the contact input section; a proximity position obtaining section for obtaining, as a proximity position, a position of the operating object in the proximity state at which position the operating object being in the proximity state is detected by the proximity input section, the proximity position obtaining section obtaining the position of the operating object by projecting the position onto the surface of the touch panel; an inputted contents specifying section for, after the operating object is shifted from the contact state to the proximity state, specifying contents inputted by the user, in accordance with (i) the contact position obtained by the contact position obtaining section before the operating object is shifted to the proximity state and (ii) the proximity position obtained by the proximity position obtaining section after the operating object is shifted to the proximity state; and a process carrying out section for carrying out a process in accordance with inputted contents specified by the inputted contents specifying section.

Advantageous Effects of Invention

According to an aspect of the present invention, it is possible to improve operability of an information processing device.

Figure 2:
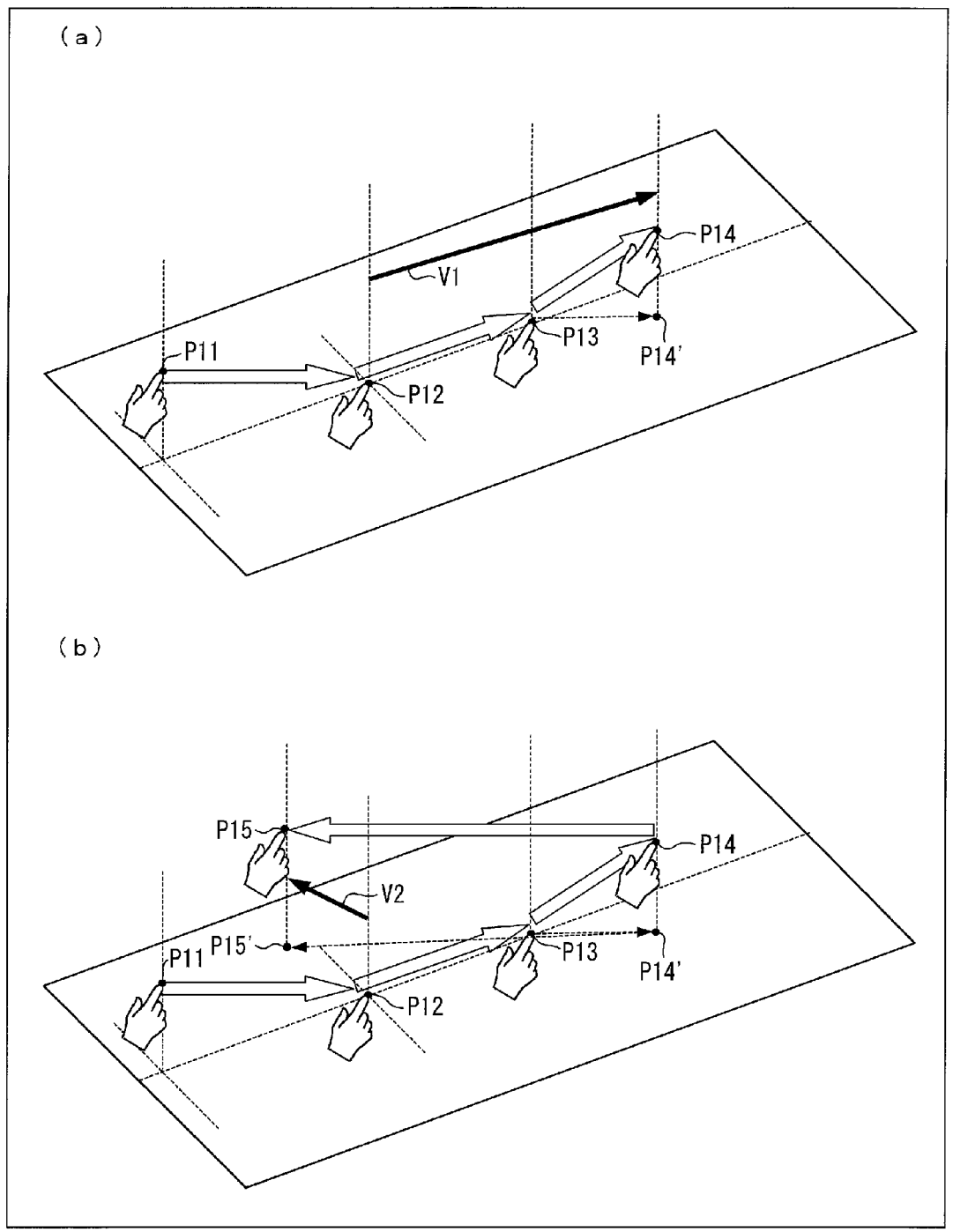

(a) and (b) of FIG. 2 are views each illustrating an example change in position of a finger on a touch panel.

Figure 3:
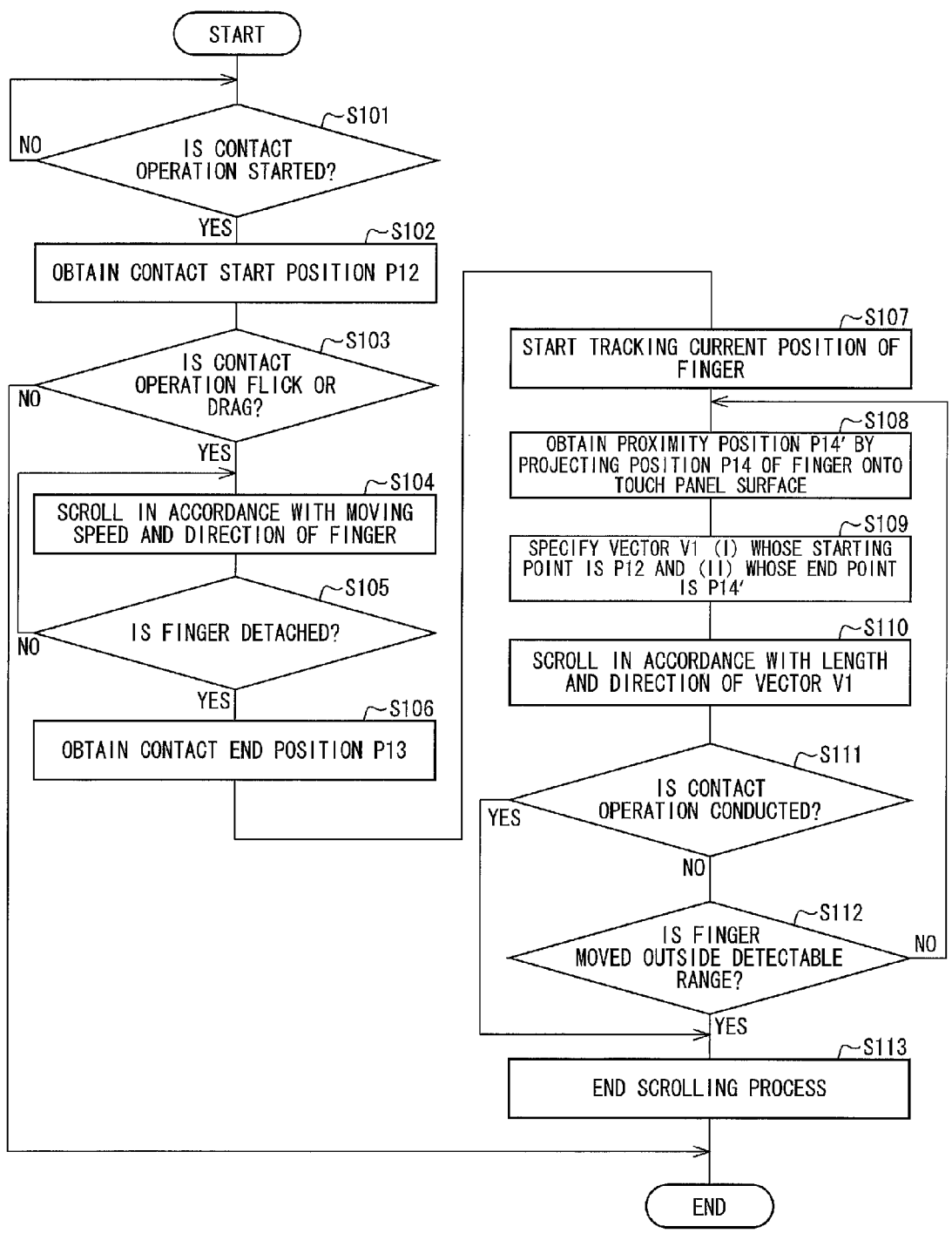

FIG. 3 is a flowchart illustrating a flow of a process carried out by the information processing device.

Figure 4:
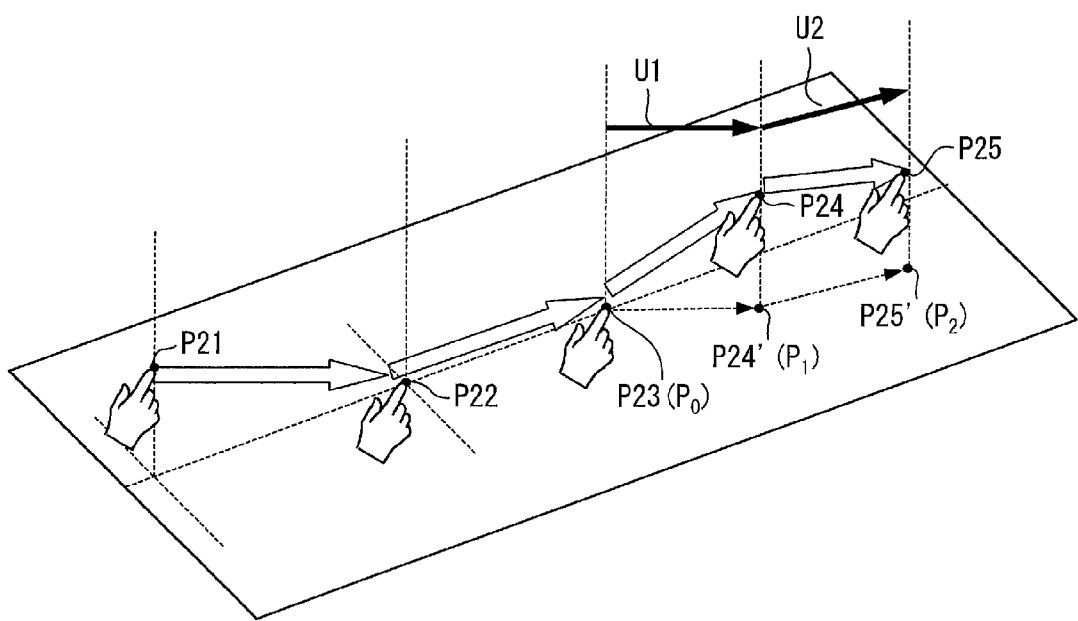

FIG. 4 is a view illustrating another example change in position of the finger on the touch panel.

Figure 5:
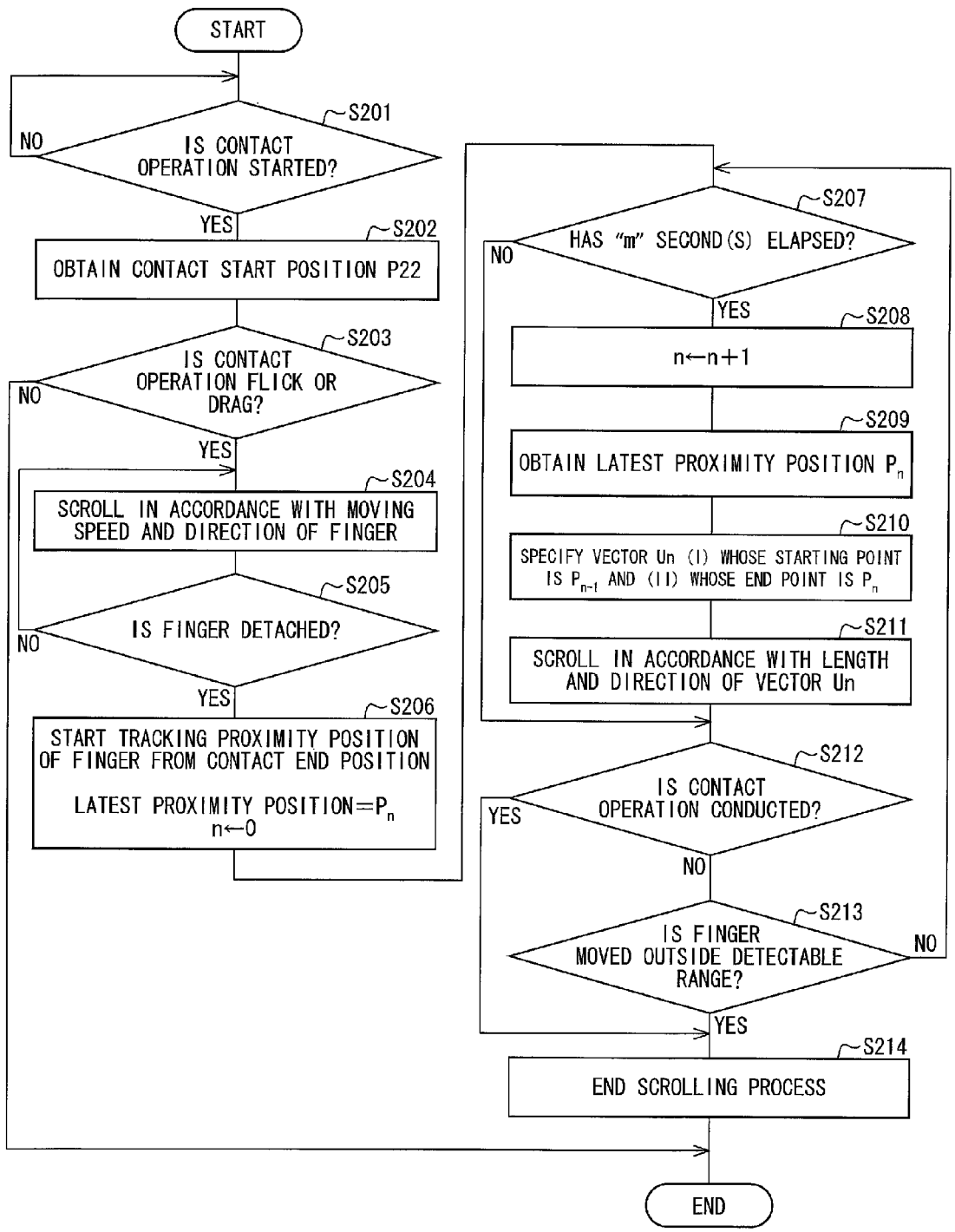

FIG. 5 is a flowchart illustrating a flow of a process carried out by an information processing device in accordance with Embodiment 2 of the present invention.

Figures 6, 7:
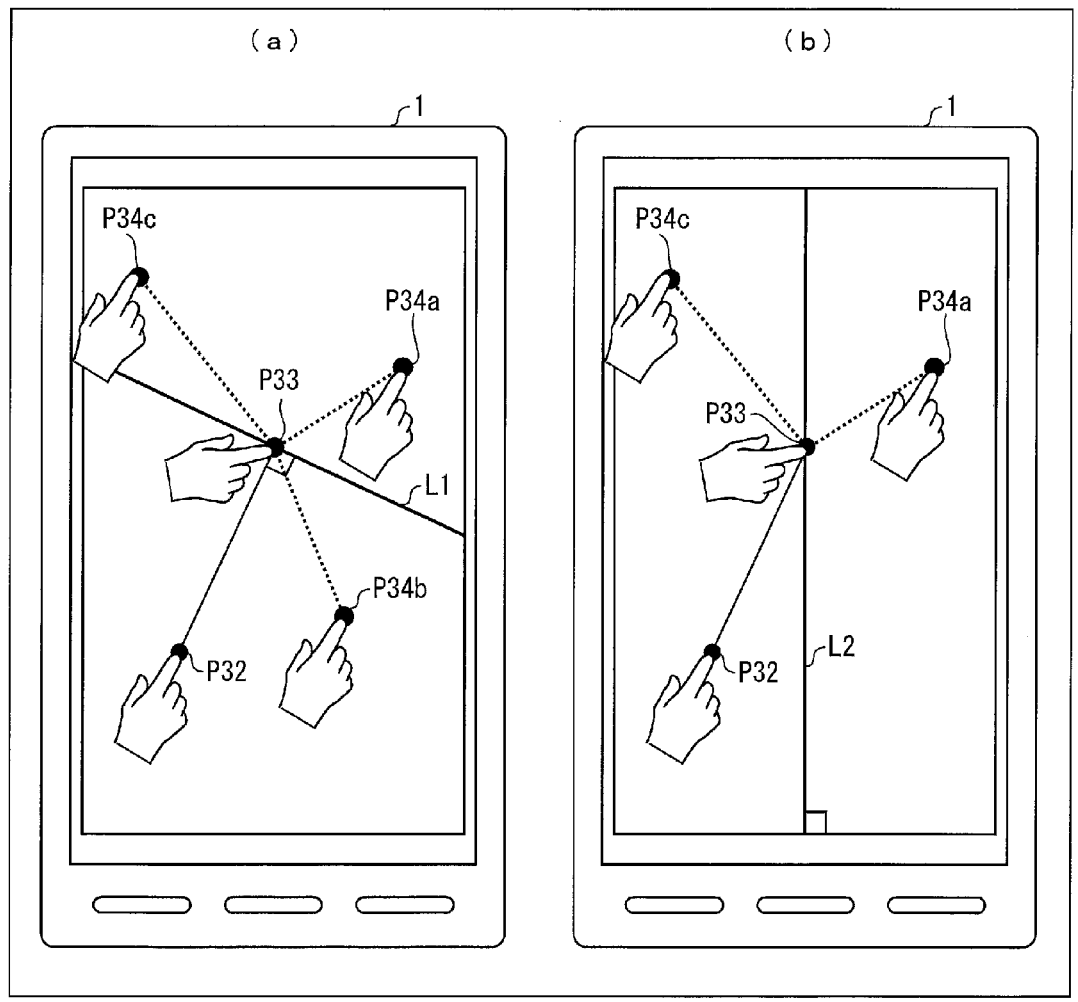

FIG. 6 is a view illustrating an example table stored in an information processing device in accordance with Embodiment 3 of the present invention.

FIG. 7 is a view illustrating an example positional relationship, between a contact start position and a proximity end position, which is defined depending on a change in position of a finger.

Figure 8:
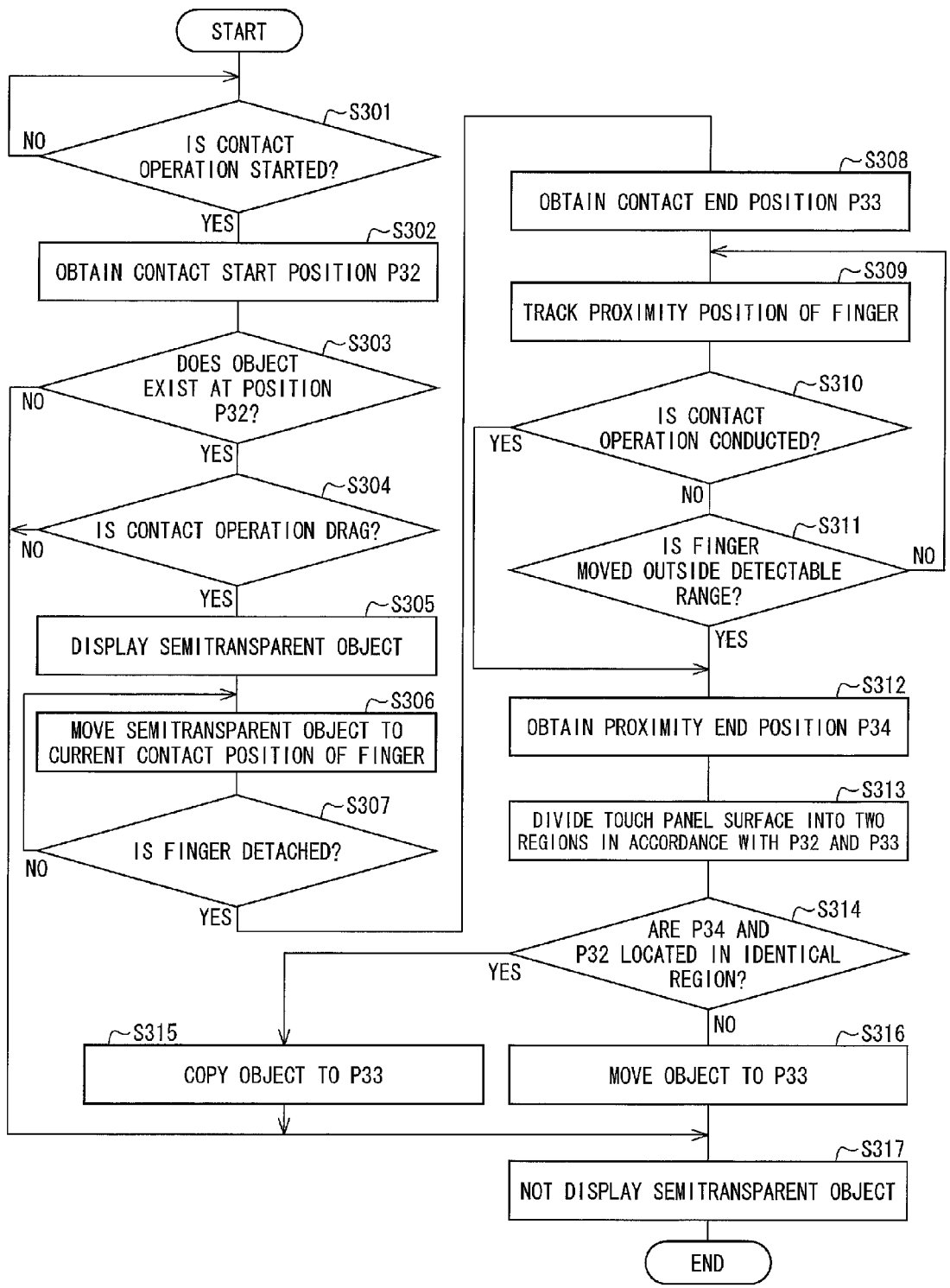

FIG. 8 is a flowchart illustrating a flow of a process carried out by the information processing device.

Figure 9:
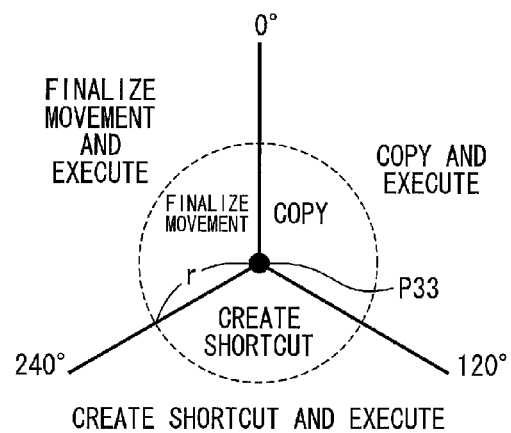

(a) of FIG. 9 is a view illustrating another example table. (b) of FIG. 9 is a view schematically illustrating regions defined in accordance with the table.

Figure 10:
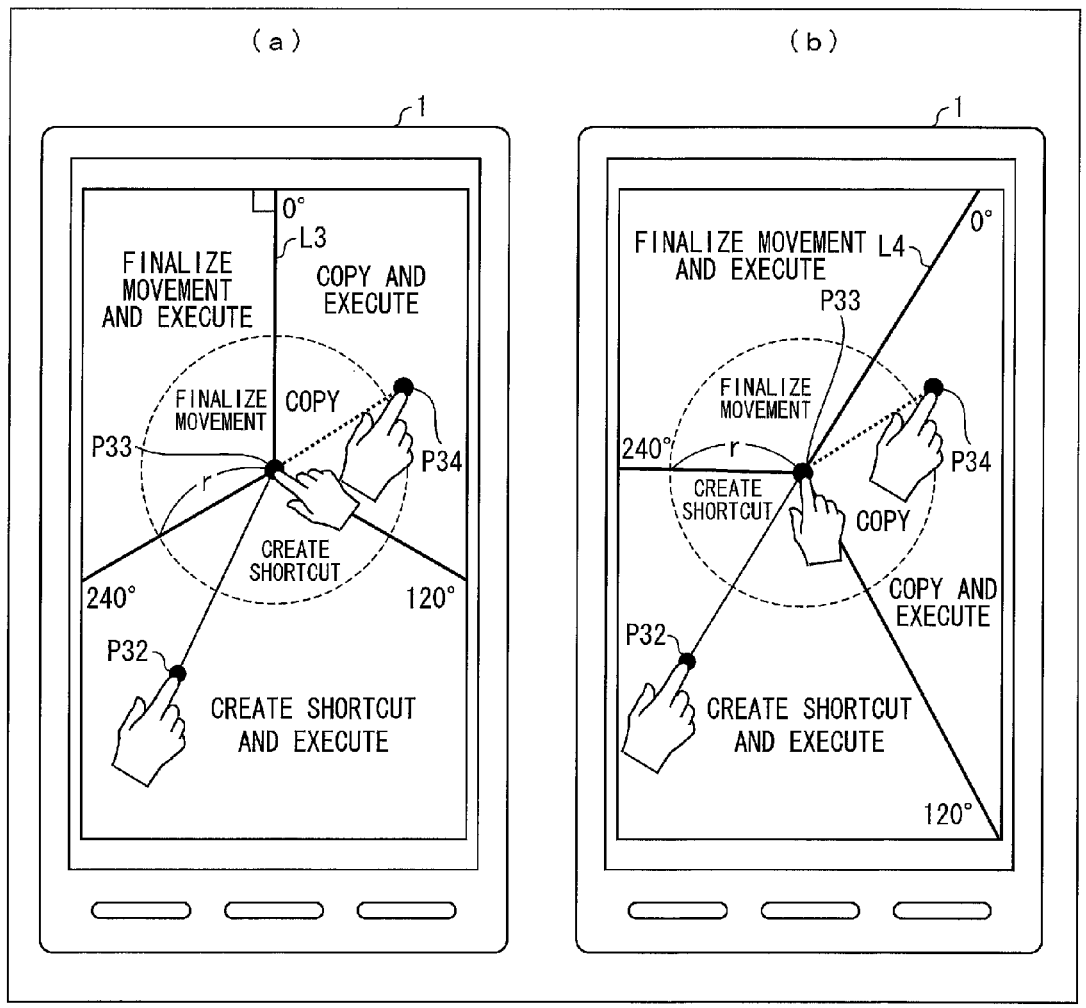

FIG. 10 is a view illustrating a positional relationship between a region defined on a touch panel and an operation position.

DESCRIPTION OF EMBODIMENTS

<<Embodiment 1>>

[Configuration of Information Processing Device 1]

Figure 1:
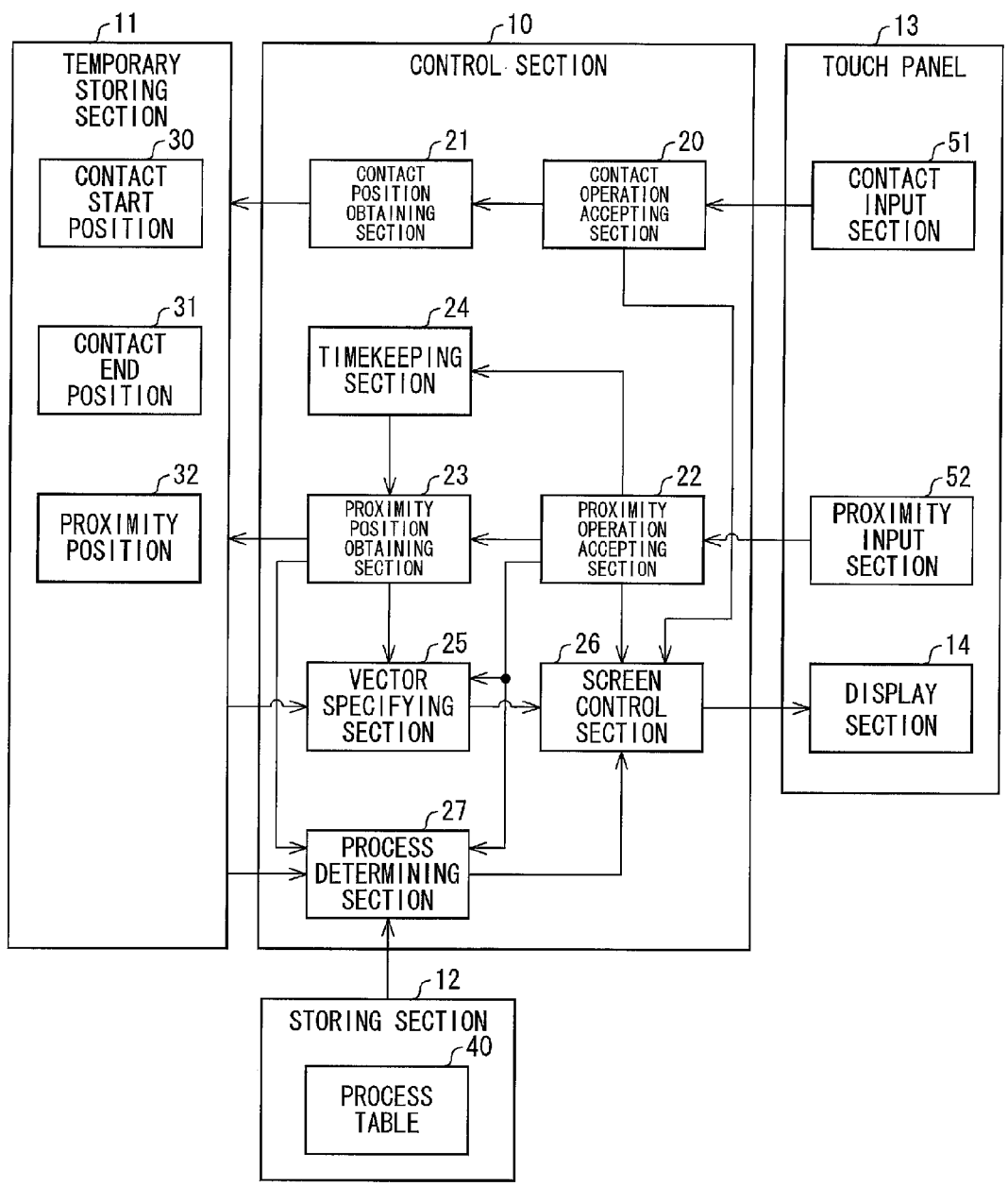
FIG. 1 is a functional block diagram illustrating a configuration of a main part of an information processing device of the present invention.

The following description will discuss, in detail, Embodiment 1 of the present invention with reference to FIGS. 1 through 3. FIG. 1 is a functional block diagram illustrating a configuration of a main part of an information processing device 1. The information processing device 1 includes a touch panel. The information processing device 1 is a mobile information processing device such as a mobile phone, a smartphone, or a tablet PC. Note, however, that the information processing device 1 is not limited to such, and can be alternatively a stationary information processing device such as a personal computer including a touch panel or an electronic backboard.

As described in FIG. 1, the information processing device 1 includes a control section 10, a temporary storing section 11, a storing section 12, a touch panel 13, and a display section 14. The temporary storing section 11 is realized by a volatile storing device such as a RAM (Random Access Memory). The temporary storing section 11 is employed as a working area, in which the control section 10 temporarily stores data used while executing various programs. Among others, the temporary storing section 11 stores therein a contact start position 30 and a contact end position 31. The storing section 12 is realized by a non-volatile storing device such as a flash memory. The touch panel 13 is an input device, which accepts a contact operation conducted by a user and which conveys, to the information processing device 1, an instruction related to the contact operation. The display section 14 includes a flat display panel such as a liquid crystal panel or an organic EL panel. The display section 14 displays information, an image, and/or the like, each of which is processed by the information processing device 1. According to Embodiment 1, the display section 14 is provided integrally with a contact input section 51 and a proximity input section 52 so as to constitute the touch panel 13.

The contact input section 51 is realized by a touch sensor. The touch sensor detects a position where an operating object (hereinafter, the operating object means a user's finger) contacts on a surface of the touch panel 13 (touch panel surface). The proximity input section 52 detects a position where the finger is in a non-contact state (that is, a proximity state) and within a detectable range which is away, by a given distance or less, from the touch panel surface. The proximity input section 52 can be realized by a proximity sensor capable of detecting, instead of detecting a distance (a Z coordinate) between the touch panel surface and the finger, only a position (an X coordinate and a Y coordinate) which is obtained by vertically projecting, onto the touch panel surface, a position of the finger which is in the proximity state. Alternatively, the proximity input section 52 can be realized by a proximity sensor capable of further detecting the distance (the Z coordinate).

The information processing device 1 carries out a process, in which a screen is scrolled in accordance with (i) positional information on the finger which is in contact with the touch panel surface and (ii) positional information on the finger which has been in the proximity state. Note that, in such a process, the information processing device 1 uses these pieces of positional information distinctively. More specifically, the information processing device 1 carries out a scrolling process (first process (hereinafter, referred to as a first scrolling process)) in accordance with the positional information on the finger which is in the contact state, and successively carries out a scrolling process (second process, second scrolling process), which is different from the first scrolling process, in accordance with the positional information on the finger which is in the proximity state. Note that, while carrying out the second scrolling process, the information processing device can also take into consideration the positional information on the finger which is in the contact state. That is, the information processing device 1 can carry out the second scrolling process in accordance with a combination of (i) the positional information on the finger which is in the contact state and (ii) the positional information on the finger which is in the proximity state. This allows the user to conduct a variety of operations by distinctively using or combining the positional information on the finger which is in the contact state and the positional information on the finger which is in the proximity state of the finger. This ultimately allows the user to scroll the screen in a variety of ways. The following description will discuss a software configuration by which the information processing device 1 of the present embodiment realizes the scrolling processes.

The control section 10 collectively controls the whole of the information processing device 1. The control section 10 can be realized by a CPU (Central Processing Unit) and the like. The control section 10 includes, as functional blocks, a contact operation accepting section 20, a contact position obtaining section 21, a proximity operation accepting section 22, a vector specifying section 25, and a screen control section 26. Note that, out of members illustrated in FIG. 1, members which are not described in Embodiment 1 are not necessarily provided in the information processing device 1.

The contact operation accepting section 20 accepts, via the contact input section 51, a contact operation conducted by the user. Specifically, the contact operation accepting section 20 tracks positions of the finger from when the finger is brought into contact with the touch panel surface to when the finger is detached from the touch panel surface, and determines what contact operations (tap, flick, drag, pinch-in, pinch-out, etc.) were conducted at which respective positions. Note that, in Embodiments 1 and 2, a flick and a drag are not particularly distinguished from each other, and are each recognized as a contact operation of sliding the finger, which is made up of (i) bringing the finger into contact with the touch panel surface, (ii) moving the finger, and (iii) ending the contact of the finger with the touch panel surface. Such a contact operation will be referred to as a flick, for convenience. Note, however, that the term "flick" does not exclude a so-called drag.

The contact position obtaining section 21 obtains a specific contact position out of contact positions which are accepted by the contact operation accepting section 20, and stores the specific contact position in the temporary storing section 11. Specifically, the contact position obtaining section 21 obtains (i) a contact start position 30 indicative of a position at which the finger is brought into contact with the touch panel surface and/or (ii) a contact end position 31 indicative of a position at which the finger is detached from the touch panel surface, and then stores the contact start position 30 and/or the contact end position 31 in the temporary storing section 11.

The proximity operation accepting section 22 accepts, via the proximity input section 52, a proximity operation conducted by the user. Specifically, the proximity operation accepting section 22 tracks, in accordance with signals supplied from the proximity input section 52, positions of the finger, while the finger is in the non-contact state and is away, by the given distance or less, from the touch panel surface (within the detectable range of the proximity input section 52). The proximity operation accepting section 22 can specify a position of the finger with use of three-dimensional coordinates or can alternatively specify the position of the finger with use of two-dimensional coordinates by plotting the position of the finger on coordinates of the touch panel surface. In Embodiment 1, the position of the finger is specified with use of two-dimensional coordinates, and such a position of the finger which is in the proximity state is referred to as a proximity position.

The vector specifying section 25 specifies a vector, to be used in a subsequent process, in accordance with a contact position or a proximity position which is obtained based on a contact operation or a proximity operation, respectively, otherwise a contact position or a proximity position which is obtained based on both a contact operation and a proximity operation conducted by the user. The vector specified by the vector specifying section 25 is treated as information which specifies a scrolling speed and a scrolling direction at and in which the information processing device 1 scrolls a screen. Specifically, the vector specifying section 25 specifies a vector (i) whose starting point is a contact start position 30 (or a contact end position 31) which is obtained by the contact position obtaining section 21 and (ii) whose end point is a latest proximity position which is specified by the proximity operation accepting section 22. The vector specifying section 25 then supplies the vector to the screen control section 26.

The screen control section 26 carries out various processes with respect to a screen, which is to be displayed on the display section 14. In Embodiment 1, the screen control section 26 carries out scrolling processes in which the screen is caused to be scrolled in accordance with an operation conducted by the user. Specifically, the screen control section 26 first carries out the first scrolling process, while the finger is in the contact state, in which the screen is caused to be scrolled in accordance with a moving speed and a moving direction of the finger which are accepted by the contact operation accepting section 20. After the finger shifts to the proximity state, the screen control section 26 carries out the second scrolling process, while the finger is kept in the proximity state, in which the screen is caused to be scrolled in accordance with a length and a direction of a vector specified by the vector specifying section 25.

[Flow of Process Carried out by Information Processing Device 1]

(a) and (b) of FIG. 2 are views each illustrating an example change in position of the finger on the touch panel.

FIG. 3 is a flowchart illustrating a flow of a process carried out by the information processing device 1.

It is assumed that the user's finger is moved, for example, from a position P11 at which the finger is in the non-contact state to a position P12 at which the finger is in the contact state, so as to be brought into contact with the touch panel surface. In this case, the contact operation accepting section 20 determines that a contact operation is started at the position P12 which is a contact start position (Yes, in step S101). The contact position obtaining section 21 next obtains such a contact start position P12 and stores, in the temporary storing section, the contact start position P12 as a contact start position 30 (step S102). Thereafter, in a case where the finger is brought to the non-contact state again at the contact start position P12 without moving from the contact start position P12, the contact operation accepting section 20 determines that a contact operation (such as a tap), other than a flick, is conducted (No, in step S103). In this case, the information processing device 1 carries out a process (not illustrated) in accordance with the contact operation. A series of processes thus ends.

On the other hand, in a case where the user starts moving the finger from P12 toward P13 while keeping the finger in the contact state, the contact operation accepting section 20 determines that such a contact operation is a flick in which the finger is slid (Yes, in the step S103). In this case, the screen control section 26 controls a screen, which is to be displayed on the display section 14, to be scrolled in accordance with a moving speed and a moving direction of the finger which is being moved from P12 toward P13 (step S104; first scrolling process). As long as the finger is not detached from the touch panel surface (No, in step S105), the screen control section 26 continues the first scrolling process.

After that, in a case where the user finish moving the finger at the position P13 and detaches the finger from the touch panel surface at the position P13 (see (a) of FIG. 2), the contact operation accepting section 20 ends tracking of contact positions of the finger at a time point when the finger is detached from the touch panel surface (Yes, in the step S105). The contact position obtaining section 21 then obtains a position of the finger which position is lastly accepted by the contact operation accepting section 20, that is, the position P13 which is a contact end position. The contact position obtaining section 21 then stores, in the temporary storing section 11, such a contact end position P13 as a contact end position 31 (step S106).

Here, the finger is detached from the touch panel surface and is thus brought to the proximity state. The proximity operation accepting section 22 starts, from the contact end position P13, tracking proximity positions of the finger in accordance with signals supplied from the proximity input section 52 (step S107).

After conducting the contact operation, the user successively conducts a proximity operation. Specifically, the user moves the finger from the contact end position P13 to a position P14 in the detectable range while keeping the finger in the proximity state. While the user is moving the finger, the proximity positions of the finger are constantly tracked by the proximity operation accepting section 22. The proximity operation accepting section 22 accepts a proximity position P14' which is obtained by vertically projecting a current position P14 of the finger onto the touch panel surface (step S108). In this case, the vector specifying section 25 specifies a vector V1 (i) whose starting point is the contact start position P12 which is obtained by the contact position obtaining section 21 and (ii) whose end point is the proximity position P14' which is lastly obtained by the proximity operation accepting section 22 (step S109). The screen control section 26 then controls the screen, which is to be displayed on the display section 14, to be scrolled in accordance with a length and a direction of the vector V1 (step S110; second scrolling process).

Thereafter, while the finger is kept in the proximity state, processes of the steps S108 through S110 are repeated in accordance with a latest proximity position of the finger. That is, in a case where (i) the contact operation accepting section 20 does not again detect a contact operation (No, in step S111) and (ii) the proximity operation accepting section 22 continues to detect the finger in the detectable range (No, in step S112), the proximity operation accepting section 22 continues to track a latest proximity position of the finger, and the vector specifying section 25 continues to update a vector in accordance with the latest proximity position. Then, the screen control section 26 continues the second scrolling process while causing a scrolling speed and a scrolling direction to be changed in accordance with the vector thus updated. By thus arbitrarily moving the position of the finger in the proximity state, the scrolling speed and the scrolling direction can be flexibly changed.

It is assumed that, for example, the user moves the finger from the position P14 to a position P15 illustrated in (b) of FIG. 2. In this case, the vector specifying section 25 specifies a vector V2 (i) whose starting point is the contact start position P12 and (ii) whose end point is a proximity position P15' which corresponds to the position P15 that is a latest position of the finger. The screen control section 26 then controls the screen, which has been scrolled at a higher speed in a direction of the vector V1, to be scrolled at a lower speed in a direction of the vector V2. Note that the vector specifying section P25 can employ, as a starting point of a vector, the contact end position P13, instead of the contact start position P12.

In a case where the finger is brought into contact with the touch panel surface and is no longer in the proximity state (Yes, in the step S111) or in a case where the finger is moved outside the detectable range (Yes, in the step S112), the screen control section 26 ends the second scrolling process (step S113). Note that, in a case of Yes in the step S111 and in a case where the finger is stopped in the contact state, the screen control section 26 can control scrolling of the screen to be stopped. Alternatively, in a case where another flick is conducted, the screen control section 26 can carry out the first scrolling process. Alternatively, in a case of Yes in the step S112, the screen control section 26 can control the scrolling of the screen to be continued through inertia and then to be slowly stopped.

As has been described, the information processing device 1 in accordance with Embodiment 1 carries out the first scrolling process (first process) in accordance with an operation conducted with the use of an operating object which is in a contact state, and then carries out the second scrolling process (second process) in accordance with an operation conducted with the use of the operating object which is in a proximity state, so as to change a scrolling direction and a scrolling speed in the first scrolling process. That is, it is possible for a user to flexibly modify a contact operation which the user conducted in the past, by successively conducting a proximity operation.

This function is particularly effective in a use scene, such as a map display application, in which a screen is scrolled in various directions for a long time. Conventionally, a scrolling speed, amount, direction, and the like have been determined at a time point when a flick is conducted. Therefore, it has not been possible to arbitrary change the scrolling speed, amount, direction, and the like after the flick is conducted. Specifically, it is assumed that a screen is scrolled at a high speed by a prompt flick so that a map around a distant destination is displayed. In a case where, due to such high-speed scrolling, the destination is missed and the map around the destination passes away from the screen, it has conventionally been necessary to repeat an operation of stopping scrolling of the screen once and conducting a flick again. In contrast, according to the information processing device 1 of the present invention, even after conducting a flick, a user is capable of flexibly adjusting or modifying a scrolling speed and a scrolling direction each of which has been specified by the flick previously conducted, by arbitrary changing a position of a finger, which is in a proximity state, in a successive proximity operation. Therefore, even in a case where the map around the destination passes away from the screen, it is possible to easily change the scrolling speed and direction without necessity of cancelling a previously conducted contact operation. That is, it is possible to flexibly modify the previously conducted contact operation by successively conducting the proximity operation. As a result, unlike the conventional technique, it is not necessary to repeatedly conduct a flick and/or stop scrolling of a screen. Thus, this brings about a merit, which causes an improvement in user's operability. Note that, even in a case where scrolling is needed in a given direction as in the case of an address book, the information processing device 1 of the present embodiment is effective in a use scene in which the screen is scrolled extending for a long distance at a high speed.

<<Embodiment 2>>

The following description will discuss another embodiment of the information processing device of the present invention with reference to FIGS. 1, 4, and 5. Note that, for convenience, identical reference numerals will be given to respective members having functions identical to those of the members illustrated in the drawings described in Embodiment 1, and the members will not be repeatedly described. The same applies to the subsequent embodiments.

[Configuration of Information Processing Device 1]

An information processing device 1 of Embodiment 2 further includes, as functional blocks, a proximity position obtaining section 23 and a timekeeping section 24, in addition to the configuration of the information processing device 1 of Embodiment 1. The information processing device 1 of Embodiment 2 does not necessarily include a process determining section 27 and a process table 40.

The timekeeping section 24 measures elapsed time. In Embodiment 2, the timekeeping section 24 starts measuring time from a time point when a proximity state of a finger is started after a contact state of the finger is ended, and notifies, while the finger is kept in the proximity state, the proximity position obtaining section 23 of given time ("m" second(s) in Embodiment 2) having elapsed each time the given time has elapsed.

The proximity position obtaining section 23 obtains a specific proximity position out of proximity positions which are accepted by a proximity operation accepting section 22, and stores the specific proximity position in a temporary storing section 11. Specifically, in synchronization with a notification sent from the timekeeping section 24 at intervals of "m" second(s), the proximity position obtaining section 23 obtains, from the proximity operation accepting section 22, a proximity position which is accepted by proximity operation accepting section 22 at the time when the notification is given (that is, a lastly obtained proximity position), and stores the lastly obtained proximity position in the temporary storing section 11 as a proximity position 32. In Embodiment 2, the proximity position 32 has a data structure which contains at least (i) the lastly obtained proximity position and (ii) a previously obtained proximity position, that is, a proximity position obtained "m" second(s) before a time point when the lastly obtained proximity position is obtained. Therefore, the proximity position 32 is a storage region in which at least two proximity positions are stored. This storage region is a storage region of the temporary storing section 11. Note that, hereinafter, a lastly obtained proximity position will be referred to as a latest proximity position and the previously obtained proximity position will be referred to as a previous proximity position.

In Embodiment 2, a vector specifying section 25 specifies a vector (i) whose starting point is the previous proximity position which is stored in the temporary storing section 11 and (ii) whose end point is the latest proximity position which is stored in the temporary storing section 11, and then supplies the vector thus specified to a screen control section 26.

[Flow of Process Carried out by Information Processing Device 1]

FIG. 4 is a view illustrating an example change in position of a finger on a touch panel surface. FIG. 5 is a flowchart illustrating a flow of a process carried out by the information processing device 1. Note that steps S201 through S205 illustrated in FIG. 5 are carried out in a manner similar to the steps S101 through S105, respectively, illustrated in FIG. 3 of Embodiment 1. In the step S202, a contact start position P22 is stored as a contact start position 30 (see FIG. 4). In the step S204, a first scrolling process is carried out.

It is assumed that the finger, which has been in the contact state from the contact start position P22, is detached from the touch panel surface at a position P23. In this case (Yes, in the step S205), a contact position obtaining section 21 obtains such a contact end position P23, and then stores, in the temporary storing section 11, the contact end position P23 as a contact end position 31. Meanwhile, the proximity operation accepting section 22 starts tracking proximity positions of the finger which has shifted to the proximity state (step S206). Note that, hereinafter, a latest proximity position is represented by Pn, and "n" of a latest proximity position Pn indicates a subscript.

The timekeeping section 24 starts measuring time from a time point when the proximity operation accepting section 22 starts tracking the proximity positions of the finger (that is, when the finger is detached from the touch panel surface). It is assumed that a time point when measurement of the time is started is represented by n=0 (zero). That is, according to an example illustrated in FIG. 4, the contact end position P23 is represented by a latest proximity position Pn=P0 (zero) at a time point when a contact operation is ended (i.e., a time point when a proximity operation is started). When the given time of "m" second(s) has elapsed since a start of the measurement of the time (Yes, in step S207), the timekeeping section 24 notifies the proximity position obtaining section 23 of the given time of "m" second(s) having elapsed. Thereafter, the timekeeping section 24 notifies, at intervals of "m" second(s), the proximity position obtaining section 23 of the given time of "m" second(s) having elapsed (the step S207). Each time the timekeeping section 24 notifies the proximity position obtaining section 23 of "m" second(s) having elapsed, the proximity position obtaining section 23 increments, by one, the subscript "n" of Pn indicative of a latest proximity position (step S208).

For example, it is assumed that, while keeping the finger in the proximity state, the user moves the finger to a position P24 after "m" second(s) have elapsed since a time point (n=0 (zero)) when the finger was located at the contact end position P23 (see the example illustrated in FIG. 4). In this case, upon receipt of a notification, from the timekeeping section 24, of "m" second(s) having elapsed, the proximity position obtaining section 23 obtains, from the proximity operation accepting section 22, coordinates of a proximity position P24' which is obtained in accordance with the position P24 (current position of the finger) (step S209). The proximity position obtaining section 23 then stores, in the temporary storing section 11, the coordinates in association with a proximity position P1 whose subscript is one (1) and which is obtained by incrementing a previous subscript by one. At this point, an updated proximity position 32 includes (i) P0 (zero)=P23 as a previous proximity position and (ii) a latest proximity position P1=P24'.

In a case where the proximity position 32 is updated by the proximity position obtaining section 23, the vector specifying section 25 specifies a vector Un (i) whose starting point is a previous proximity position Pn−1 and (ii) whose end point is a latest proximity position Pn (according to the above example, the vector specifying section 25 specifies a vector U1 illustrated in FIG. 4) (step S210).

In a case where the vector is specified by the vector specifying section 25, the screen control section 26 controls a screen to be scrolled in accordance with a length and a direction of the vector thus specified (for example, vector U1) (step S211; second scrolling process).

Thereafter, while the finger is kept in the proximity state (No in step S212 and No in step S213), the timekeeping section 24 continues to measure time at intervals of "m" second(s), and processes of the steps S208 through S211 are repeated every "m" second(s). For example, it is assumed that the user further moves the finger, located at P24, to a position P25 "m" second(s) later. In this case, the proximity position 32 is updated, by the proximity position obtaining section 23, to (i) P1=P24' serving as a previous proximity position and (ii) P2=P25' serving as a latest proximity position (the steps S208 and S209). The vector specifying section 25 then specifies a vector U2 in accordance with the previous proximity position P1 and the latest proximity position P2 (the step S210). The screen control section 26 controls the scrolling direction and speed to be changed in accordance with the vector U2 thus newly specified, and controls the screen to be scrolled in/at the scrolling direction and speed thus changed (the step S211).

On the other hand, in a case where a contact operation is again conducted (Yes, in the step S212) or in a case where the finger is moved outside a detectable range (Yes, in the step S213), the screen control section 26 ends the second scrolling process in the step S211 (step S214). As with Embodiment 1, the screen control section 26 only needs to end the second scrolling process by, for example, controlling scrolling of the screen to be stopped, restarting the first scrolling process, or controlling the scrolling of the screen to be continued through inertia and then to be stopped, depending on an operation detected in the step S212 or S213.

As has been described, the information processing device 1 of Embodiment 2, unlike that of Embodiment 1, is configured so as to obtain and store, out of proximity positions tracked by the proximity operation accepting section 22, a proximity position at intervals of given time (hereinafter, "m" second(s)). The information processing device 1 then scrolls a screen in accordance with a latest proximity position and a previous proximity position (proximity position obtained "m" second(s) before).

According to the above configuration and method, the information processing device 1 in accordance with Embodiment 2 is capable of (i) accepting a proximity operation following a contact operation and (ii) changing a scrolling direction and speed in the first scrolling process. Furthermore, after shifting to the second scrolling process, the information processing terminal 1 obtains a latest proximity position at intervals of given time. Therefore, while the proximity operation is being conducted, the information processing device 1 is capable of modifying a scrolling direction and speed which are specified by the proximity operation conducted given time before, in accordance with a latest proximity position. That is, it is possible for a user to flexibly modify not only a contact operation which the user conducted in the past but also a proximity operation, following the contact operation, which the user conducted in the past. As a result, unlike the conventional technique, it is not necessary to repeatedly conduct a flick and/or stop scrolling of a screen. It is therefore possible to bring about an effect of improving the user's operability.

<<Embodiment 3>>

[Configuration of Information Processing Device 1]

The following description will discuss a further embodiment of the information processing device of the present invention with reference to FIG. 1 and FIGS. 6 through 10. An information processing device 1 of Embodiment 3 further includes, as a functional block, a process determining section 27, in addition to the configuration of the information processing device 1 of Embodiment 1. Further, the information processing device 1 of Embodiment 3 stores a process table 40 in a storing section 12. In Embodiment 3, functional blocks of a timekeeping section 24 and a vector specifying section 25 are each not an essential configuration.

In Embodiment 3, it is assumed that a user first drags and drops, as a contact operation, an object (such as an icon) displayed on a display section 14 and then conducts a proximity operation (operation of moving a fingertip to another position). A contact operation accepting section 20 detects such a drag and drop, and then a proximity operation accepting section 22 tracks proximity positions of the finger in a detectable range.

In Embodiment 3, in a case where the finger is moved outside the detectable range, so that the proximity operation accepting section 22 ends tracking of the finger, a proximity position obtaining section 23 (i) obtains a proximity position (hereinafter, referred to as a proximity end position) which is lastly accepted by the proximity operation accepting section 22 and (ii) stores, in a temporary storing section 11, the proximity position as a proximity position 32. That is, in Embodiment 3, the proximity position 32 has a data structure which contains a proximity end position.

In a case where the proximity operation, following the contact operation, is ended, the process determining section 27 determines a process to be carried out with respect to the object selected by the contact operation (drag). This causes the process determining section 27 to fix a user's operation. The process determining section 27 determines the process to be carried out, in accordance with a positional relationship between a contact position and the proximity position of the finger. In Embodiment 3, a screen control section 26 controls whole processes related to display of the object subjected to the contact operation or the proximity operation. For example, in accordance with a contact operation, the screen control section 26 controls, as a first process, (i) selecting of an object, (ii) making such an object semitransparent, and (iii) movement (provisional movement) of a semitransparent object. In a case where the proximity operation is fixed, the screen control section 26 controls, as a second process, (a) finalizing of the movement of the object which has been subjected to the above first process or (b) copying of the object, in accordance with the proximity operation. Which one of the processes (a) and (b) should be controlled is determined by the process determining section 27. The process determining section 27 determines the second process to be controlled by the screen control section 26, in accordance with a proximity end position and with reference to the process table 40.

[Process Table 40]

FIG. 6 is a view illustrating an example of the process table 40. As illustrated in FIG. 6, the process table 40 is a table in which a positional relationship between a contact start position and a proximity end position is associated with a process to be carried out. According to the process table 40 illustrated in FIG. 6, in a case where the contact start position and the proximity end position are located in respective different regions (hereinafter, referred to as a positional relationship A), such a positional relationship is associated with a second process of finalizing movement of an object. Meanwhile, in a case where the contact start position and the proximity end position are located in an identical region (hereinafter, referred to as a positional relationship B), such a positional relationship is associated with a second process of copying the object. Note that FIG. 6 illustrates an example in which the process table 40 is represented as having data structure in a table form. However, this does not intend to limit the data structure of the process table 40 to a table-form data structure. The same applies to any table illustrated in the following drawings.

How the positional relationships A and B are determined will be described below with reference to a detailed example illustrated in (a) of FIG. 7. (a) of FIG. 7 is a view illustrating an example positional relationship between a contact start position and a proximity end position each of which is defined, in Embodiment 3, depending on a change in position of the finger. (b) of FIG. 7 is a view illustrating another example positional relationship between the contact start position and the proximity end position.

It is assumed that (i) a contact start position P32 and a contact end position P33 are fixed after a contact operation is conducted and (ii) a proximity end position P34 (such as P34a, P34b, and P34c) is fixed at a time point when the finger is moved outside the detectable range after a proximity operation is conducted. In this case, the process determining section 27 first determines which one of the positional relationships A and B a positional relationship between the contact start position and the proximity end position corresponds to. Specifically, the process determining section 27 defines two regions on a screen with the use of a straight line L1 serving as a boundary line. The straight line L1 extends so as to be perpendicular to a line segment (solid line) obtained by connecting the contact start position P32 and the contact end position P33, and passes through the contact end position P33. In a case where the contact start position P32 and the proximity end position P34 are located in respective different regions (for example, P34a and P34c each indicate the proximity end position), the process determining section 27 determines that the positional relationship between the contact start position and the proximity end position corresponds to the positional relationship A. Then, the process determining section 27 instructs, in accordance with the process table 40, the screen control section 26 to control the finalizing of movement of an object to the contact end position P33 in the first process. In a case where the contact start position P32 and the proximity end position P34 are located in an identical region (for example, P34*b* indicates the proximity end position), the process determining section 27 determines that the positional relationship between the contact start position P32 and the proximity end position P34 corresponds to the positional relationship B. Then, the process determining section 27 instructs the screen control section 26 to control the copying of the object to the contact end position P33.

The process determining section 27 can alternatively define the two regions on the screen with the use of a straight line L2 serving as the boundary line. The straight line L2 is a vertical line which passes through the contact end position P33 and which divides a touch panel surface into right and left (see (b) of FIG. 7).

[Flow of Process Carried out by Information Processing Device 1]

FIG. 8 is a flowchart illustrating a flow of a process carried out by the information processing device 1.

In a case where the contact operation accepting section 20 detects a contact operation (Yes, in step S301), a contact position obtaining section 21 obtains a contact start position (such as P32), and stores coordinates of the contact start position as a contact start position 30 (step S302). In a case where it becomes clear that an object exists at the contact start position P32 and that the contact operation is a drag (Yes in step S303 and Yes in step S304), the screen control section 26 controls displaying of the object in a state where the object is semitransparent (step S305). Such a semitransparent object is displayed so as to follow contact positions which the contact operation accepting section 20 tracks (step S306). While the finger is being kept in a contact state, (No, in step S307), the step S306 is continuously carried out. In a case where the finger is detached from the touch panel surface at a position (such as P33) (Yes, in the step S307), the contact position obtaining section 21 obtains the contact end position P33 and stores the contact end position P33 as a contact end position 31 (step S308). Here, the contact operation is ended, and accordingly the screen control section 26 ends the first process in the steps S305 and S306. At this point in time, the original object itself is displayed at the contact start position P32, and the semitransparent object is displayed at the contact end position P33.

The proximity operation accepting section 22 starts tracking proximity positions of the finger in a proximity state from a time point when the contact operation is ended (step S309). The tracking of the proximity positions in the step S309 is continued as long as (i) a contact operation is not conducted again (No, in step S310) and (ii) the finger is not moved outside the detectable range (No, in step S311).

In a case where a contact operation is again conducted (Yes in the step S310) or in a case where the finger is moved outside the detectable range (Yes, in the step S311), the proximity position obtaining section 23 determines that the finger is no longer in the proximity state, and a proximity end position (for example, any one of P34*a* through P34*c*), which is lastly accepted by the proximity operation accepting section 22, is stored, as a proximity position 32, in the temporary storing section 11 (step S312).

Next, the process determining section 27 specifies a boundary line (for example, see L1 illustrated in FIG. 7) and defines two regions on the touch panel surface, in accordance with the contact start position P32 and the contact end position P33 (step S313). The process determining section 27 then determines whether the proximity end position P34 and the contact start position P32 are located in an identical region (which one of the positional relationships A and B a positional relationship between the proximity end position P34 and the contact start position P32 corresponds to) (step S314).

In a case where P34 and P32 are located in an identical region (the positional relationship between P34 and P32 corresponds to the positional relationship B) (Yes, in the step S314), the screen control section 26 controls, in response to an instruction given by the process determining section 27, (i) copying of the object and (ii) displaying of such a copied object at the contact end position P33 (step S315). In a case where P34 and P32 are located in respective different regions (the positional relationship between P34 and P32 corresponds to the positional relationship A) (No, in the step S314), the screen control section 26 controls finalizing of provisional movement of the object which has been made from P32 to P33. That is, the original object displayed at the contact start position P32 is moved to the contact end position P33 (step S316). For example, in a case where P34*b* indicates the proximity end position, a copy of the original object is displayed at P33 while the original object is being displayed at P32. On the other hand, in a case where P34*a* or P34*c* indicates the proximity end position, the object displayed at P32 is moved to P33. In a case where the process of the step S315 or S316 is completed, the screen control section 26 controls the semitransparent object, which has been displayed in the step S305, not to be displayed (step S317).

According to the above configuration and method, the information processing device 1 of Embodiment 3 provisionally determines, in accordance with a contact operation conducted by a user, a destination position to which an object is to be moved (first process). The information processing device 1 then determines, in accordance with a position at which a proximity operation successively conducted is ended, contents of the second process to be carried out with respect to the object (for example, whether movement of the object to the destination position is finalized or the object is copied and such a copied object is placed at the destination position), and carries out such a determination.

That is, it is possible to easily cause the information processing device to successively carry out various processes with respect to an object, merely by conducting a series of operations which is a combination of a contact operation and a proximity operation. In particular, the information processing device 1 of the present invention is capable of defining a plurality of regions on the touch panel surface in accordance with a contact position and a proximity position. It is therefore possible to assign, to the second process, as many various processes as such defined regions. As a result, it is possible to realize a flexible operation method and realize an information processing device which excels in operability.

[Variations]

(a) of FIG. 9 is a view illustrating another example of the process table 40. (b) of FIG. 9 is a view schematically illustrating regions defined in accordance with the process table 40 illustrated in (a) of FIG. 9.

The process determining section 27 can specify, in accordance with the contact end position (such as P33) and the proximity end position (such as P34), a positional relationship between the contact end position and the proximity end position, and determine the second process in accordance with the positional relationship thus specified. First, the process determining section 27 divides, with the use of a circle whose center is the contact end position P33, the touch panel surface into two regions inside and outside the circle (see (b) of FIG. 9). The process determining section 27 further divides the touch panel surface into three regions as follows. Specifically, the touch panel surface is divided into the three regions by first through third reference straight lines which extend from the contact end position P33 and are at an angle of 120 degrees with respect to each other. That is, according to the present variation, the process determining section 27 defines six regions by the first through third reference straight lines, and determines the positional relationship between the contact end position P33 and the proximity end position P34 by specifying which one of the six regions the proximity end position P34 belongs to.

As illustrated in (a) of FIG. 9, the process table 40 in the present variation has a data structure in which the six region are defined and the second process is assigned to each of the six regions. The following description will first describe a case where a distance between P33 and P34 is shorter than a radius "r" of the circle (that is, a case where the proximity end position P34 is located inside the circle). In a case where P34 is located in a first region which is at an angle of not less than 0 (zero) degree but less than 120 degrees with respect to the first reference straight line, the process determining section 27 determines, as the second process to be carried out, a process of copying an object selected in the first process. In a case where P34 is located in a second region which is at an angle of not less than 120 degrees but less than 240 degrees with respect to the first reference straight line, the process determining section 27 determines, as the second process, a process of creating a shortcut of the object. In a case where P34 is located in a third region which is at an angle of not less than 240 degrees but less than 360 degrees (0 (zero) degree) with respect to the first reference straight line, the process determining section 27 determines, as the second process, a process of finalizing movement of the object.

Next, a case where the distance between P33 and P34 is equal to or longer than the radius "r" of the circle (that is, a case where the proximity end position P34 is located outside the circle) will be described below. In a case where P34 is located in a fourth region which is at an angle of not less than 0 (zero) degree but less than 120 degrees with respect to the first reference straight line, the process determining section 27 determines, as the second process to be carried out, a series of processes of copying the object selected in the first process and then selecting and executing such a copied object. In a case where P34 is located in a fifth region which is at an angle of not less than 120 degrees but less than 240 degrees with respect to the first reference straight line, the process determining section 27 determines, as the second process, a series of processes of creating the shortcut of the object and then selecting and executing the shortcut of the object. In a case where P34 is located in a region which is at an angle of not less than 240 degrees but less than 360 degrees (0 (zero) degree) with respect to the first reference straight line, the process determining section 27 determines, as the second process, a series of processes of moving the object and then selecting and executing the object.

(a) and (b) of FIG. 10 are views each illustrating a positional relationship between the six regions defined on the touch panel and an obtained proximity position of the finger. As illustrated in (a) of FIG. 10, the process determining section 27 can (i) define, as the reference straight line, a straight line L3 which extends from P33 and is parallel to the vertical direction of the touch panel surface and (ii) define the six regions. Alternatively, as illustrated in (b) of FIG. 10, the process determining section 27 can define, as the reference straight line, a straight line L4 which extends from P32 and passes through P33. Note that the screen control section 26 preferably controls the six regions, defined by the process determining section 27, to be displayed at a time point when P33 is fixed. This allows the user to know, before the user actually finishes a proximity process, what process is to be successively carried out by bringing the finger out of the proximity state at which position. It is therefore possible to enhance convenience.

<<Software Implementation Example>>

A control block of the information processing device 1 (particularly, each functional block of the control section 10) can be implemented by a logic circuit (hardware) provided on, for example, an integrated circuit (IC chip) or can alternatively be implemented by software with the use of a CPU.

In the latter case, the information processing device 1 includes: a CPU which executes instructions of a program that is software carrying out the foregoing functions; a ROM (Read Only Memory) or a storage device (these are each referred to as a "recording medium") in which the program and various sets of data are computer (or CPU)-readably recorded; and a RAM in which the program is loaded. The object of the present invention is attained by a computer (or a CPU) reading the program from the recording medium and executing the instructions of the program. Examples of the recording medium include "non-transitory tangible media" such as tapes, disks, cards, semiconductor memories, and programmable logic circuits. Further, the program can be supplied to the computer via any transmission medium (such as a communication network and a broadcast wave) which can transmit the program. Note that the present invention can also be implemented in a form of a data signal in which the program is embodied by an electronic transmission and which is embedded in carrier waves.

[Summary]

In order to attain the foregoing object, an information processing device in accordance with Aspect 1 of the present invention includes: a contact input section (51) for detecting an operating object (finger), which is used by a user to conduct an operation, being in a contact state where the operating object is in contact with a surface of a touch panel (13); a proximity input section (52) for detecting the operating object being in a proximity state where the operating object is not in contact with the surface of the touch panel and is located within a given distance from the surface of the touch panel; a contact position obtaining section (contact operation accepting section 20, contact position obtaining section 21) for obtaining, as a contact position, a position on the touch panel at which position the operating object being in the contact state is detected by the contact input section; a proximity position obtaining section (proximity operation accepting section 22, proximity position obtaining section 23) for obtaining, as a proximity position, a position of the operating object in the proximity state at which position the operating object being in the proximity state is detected by the proximity input section, the proximity position obtaining section obtaining the position of the operating object by projecting the position onto the surface of the touch panel; an inputted contents specifying section (vector specifying section 25, process determining section 27) for, after the operating object is shifted from the contact state to the proximity state, specifying contents inputted by the user, in accordance with (i) the contact position obtained by the contact position obtaining section before the operating object is shifted to the proximity state and (ii) the proximity position obtained by the proximity position obtaining section after the operating object is shifted to the proximity state; and a process carrying out section (screen control section 26) for carrying out a process in accordance with inputted contents specified by the inputted contents specifying section.

In order to attain the foregoing object, an information processing method in accordance with Aspect 8 of the present invention is an information processing method carried out by an information processing device including a touch panel, the information processing device including: a contact input section for detecting an operating object, which is used by a user to conduct an operation, being in a contact state where the operating object is in contact with a surface of a touch panel; and a proximity input section for detecting the operating object being in a proximity state where the operating object is not in contact with the surface of the touch panel and is located within a given distance from the surface of the touch panel, the method including the steps of: (a) obtaining, as a contact position, a position on the touch panel at which position the operating object being in the contact state is detected by the contact input section; (b) obtaining, as a proximity position, a position of the operating object in the proximity state at which position the operating object being in the proximity state is detected by the proximity input section, the proximity position obtaining section obtaining the position of the operating object by projecting the position onto the surface of the touch panel; (c) after the operating object is shifted from the contact state to the proximity state, specifying contents inputted by the user, in accordance with (i) the contact position obtained in the step (a) before the operating object is shifted to the proximity state and (ii) the proximity position obtained in the step (b) after the operating object is shifted to the proximity state; and (d) carrying out a process in accordance with inputted contents specified in the step (c).

According to the above configuration and method, the user is capable of inputting, to the information processing device, various instructions by combining a contact operation and a proximity operation. It is therefore possible to realize a flexible operation method and possible to provide an information processing device which excels in operability.

The information processing device in accordance with Aspect 2 of the present invention is preferably arranged such that: in Aspect 1, in a case where the operating object is in the contact state, the process carrying out section carries out a first process in accordance with the contact position obtained by the contact position obtaining section; and after the operating object is shifted from the contact state to the proximity state, the process carrying out section carries out a second process, associated with the first process, in accordance with the inputted contents specified by the inputted contents specifying section.

According to the above configuration, it is possible to modify, by successively conducting the proximity operation, the first process carried out in accordance with the contact operation or possible to successively carry out another process. The contact operation and proximity operation are operations which can be successively conducted. Therefore, it is not necessary to conduct an operation of stopping the first process once so as to cancel the first process or not necessary to conduct an operation of causing a menu, from which the another process is read, to be displayed. This improves operability.

The information processing device in accordance with Aspect 3 of the present invention can be arranged such that: in Aspect 2, the process carrying out section carries out the first process in which a screen is caused to be scrolled in a direction, corresponding to a moving direction of the operating object which is in the contact state, at a speed corresponding to at least one of a moving distance and a moving speed of the operating object which is in the contact state; the inputted contents specifying section specifies a vector (i) whose starting point is any one of the contact position and the proximity position and (ii) whose end point is a latest proximity position; and the process carrying out section carries out the second process in which (a) the direction, determined in the first process, is caused to be changed to a direction of the vector and (b) the speed, determined in the first process, is caused to be changed to a speed corresponding to a length of the vector, so that the screen is scrolled in the direction and the speed thus changed.

The information processing device in accordance with Aspect 4 of the present invention can be arranged such that: in Aspect 2, the process carrying out section carries out at least the first process in which the object, which is displayed at a contact start position at which the operating object has been brought to the contact state, is caused to be selected; the inputted contents specifying section divides the surface of the touch panel into a plurality of regions on the basis of a contact end position at which the operating object is no longer in the contact state, and specifies the second process which is assigned to any one of the plurality of regions in which one the proximity position, lastly obtained by the proximity position obtaining section when the operating object is no longer in the proximity state, is located; and the process carrying out section carries out the second process, specified by the inputted contents specifying section, with respect to the object.

The information processing device in accordance with Aspect 5 of the present invention can be arranged such that: in Aspect 4, the process carrying out section carries out the first process in which the object, which is selected, is further caused to be provisionally moved to the contact end position at which the operating object is no longer in the contact state; and the second process, which is assigned to each of the plurality of regions and which is carried out by the process carrying out section, includes at least any one of (i) a process in which movement of the object to the contact end position, which movement has been provisionally made in the first process, is caused to be finalized, (ii) a process in which the object, provisionally moved in the first process, is caused to be copied and the object thus copied is caused to be placed at the contact end position, and (iii) a process in which a shortcut of the object, provisionally moved in the first process, is caused to be created and the shortcut is caused to be placed at the contact end position.

The information processing device in accordance with Aspect 6 of the present invention can be arranged such that, in Aspect 3, the inputted contents specifying section specifies a vector (i) whose starting point is the contact position at which the contact state ends and (ii) whose end point is the latest proximity position.

The information processing device in accordance with Aspect 7 of the present invention can be arranged such that, in Aspect 3, the proximity position obtaining section obtains the proximity position every given time while the operating object is in the proximity state, and the inputted contents specifying section specifies a vector (i) whose starting point is the proximity position which is obtained immediately prior to the latest proximity position and (ii) whose end point is the latest proximity position.

Note that the information processing device can be implemented by a computer. In this case, the scope of the present invention encompasses: a control program for causing a computer to function as each section of the information processing device; and a computer-readable recording medium in which the control program is recorded.

The present invention is not limited to the description of the embodiments, but may be altered by a skilled person in the art within the scope of the claims. An embodiment derived from a proper combination of technical means disclosed in different embodiments is also encompassed in the technical scope of the present invention. Furthermore, by a combination of technical means disclosed in different embodiments, a new technical feature can be derived.

INDUSTRIAL APPLICABILITY

The present invention is applicable to an information processing device including a touch panel.

REFERENCE SIGNS LIST

1 Information processing device, 10 Control section, 11 Temporary storing section, 12 Storing section, 13 Touch panel, 14 Display section, 20 Contact operation accepting section (contact position obtaining section), 21 Contact position obtaining section (contact position obtaining section), 22 Proximity operation accepting section (proximity position obtaining section), 23 Proximity position obtaining section (proximity position obtaining section), 24 Timekeeping section, 25 Vector specifying section (inputted contents specifying section), 26 Screen control section (process carrying out section), 27 Process determining section (inputted contents specifying section), 30 Contact start position, 31 Contact end position, 32 Proximity position, 40 Process table, 51 Contact input section, 52 Proximity input section

The invention claimed is:

1. An information processing device comprising:
a contact input section for detecting an operating object, which is used by a user to conduct an operation, being in a contact state where the operating object is in contact with a surface of a touch panel;
a proximity input section for detecting the operating object being in a proximity state where the operating object is not in contact with the surface of the touch panel and is located within a given distance from the surface of the touch panel;
a contact position obtaining section for obtaining, as a contact position, a position on the touch panel at which position the operating object being in the contact state is detected by the contact input section;
a proximity position obtaining section for obtaining, as a proximity position, a position of the operating object in the proximity state at which position the operating object being in the proximity state is detected by the proximity input section, the proximity position obtaining section obtaining the position of the operating object by projecting the position onto the surface of the touch panel;
an inputted contents specifying section for, after the operating object is shifted from the contact state to the proximity state, specifying contents inputted by the user, in accordance with (i) the contact position obtained by the contact position obtaining section before the operating object is shifted to the proximity state and (ii) the proximity position obtained by the proximity position obtaining section after the operating object is shifted to the proximity state; and a process carrying out section for carrying out a process in accordance with inputted contents specified by the inputted contents specifying section; wherein
in a case where the operating object is in the contact state, the process carrying out section carries out a first process in accordance with the contact position obtained by the contact position obtaining section;
after the operating object is shifted from the contact state to the proximity state, the process carrying out section carries out a second process, associated with the first process, in accordance with the inputted contents specified by the inputted contents specifying section;
the process carrying out section carries out the first process in which a screen is caused to be scrolled in a direction, corresponding to a moving direction of the operating object which is in the contact state, at a speed corresponding to at least one of a moving distance and a moving speed of the operating object which is in the contact state;
the inputted contents specifying section specifies a vector (i) whose starting point is any one of the contact position and the proximity position and (ii) whose end point is a latest proximity position; and
the process carrying out section carries out the second process in which (a) the direction, determined in the first process, is caused to be changed to a direction of the vector and (b) the speed, determined in the first process, is caused to be changed to a speed corresponding to a length of the vector, so that the screen is scrolled in the direction and the speed thus changed.

2. The information processing device as set forth in claim 1, wherein:
the process carrying out section carries out at least the first process in which the object, which is displayed at a contact start position at which the operating object has been brought to the contact state, is caused to be selected;
the inputted contents specifying section divides the surface of the touch panel into a plurality of regions on the basis of a contact end position at which the operating object is no longer in the contact state, and specifies the second process which is assigned to any one of the plurality of regions in which one the proximity position, lastly obtained by the proximity position obtaining section when the operating object is no longer in the proximity state, is located; and
the process carrying out section carries out the second process, specified by the inputted contents specifying section, with respect to the object.

3. The information processing device as set forth in claim 2, wherein:
the process carrying out section carries out the first process in which the object, which is selected, is further caused to be provisionally moved to the contact end position at which the operating object is no longer in the contact state; and
the second process, which is assigned to each of the plurality of regions and which is carried out by the process carrying out section, includes at least any one of (i) a process in which movement of the object to the contact end position, which movement has been provisionally made in the first process, is caused to be finalized, (ii) a process in which the object, provisionally moved in the first process, is caused to be copied and the object thus copied is caused to be placed at the contact end position, and (iii) a process in which a shortcut of the object, provisionally moved in the first process, is caused to be created and the shortcut is caused to be placed at the contact end position.

* * * * *